April 26, 1966 S. N. ZILBERFARB 3,247,860

FLUID DEVICE

Filed April 22, 1963

INVENTOR
SAUL N. ZILBERFARB

BY Edward M. Farrell
ATTORNEY

United States Patent Office 3,247,860

Patented Apr. 26, 1966

3,247,860
FLUID DEVICE

Saul N. Zilberfarb, Philadelphia, Pa., assignor to Sperry Rand Corporation, New York, N.Y., a corporation of Delaware Filed Apr. 22, 1963, Ser. No. 274,744
3 Claims. (Cl. 137—81.5)

Figure 1:
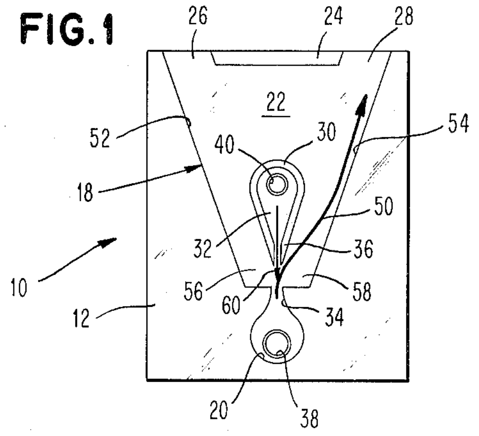

The invention relates to pure fluid amplifiers and more particularly to pure fluid amplifiers in which the direction of an elongated main stream or power stream is controlled by a fluid stream which acts traverse the power stream.

Fluid amplifiers having no moving parts except the operation fluid, or pure fluid amplifiers, are known in the art. They comprise generally a system of interconnected fluid channels arranged such that a fluid power stream may be switched from one output channel to another by means of one or more fluid control streams each of which has less momentum than the power stream.

Pure fluid amplifiers are of two general types, namely momentum exchange amplifiers and boundary layer control amplifiers. In a momentum exchange amplifier a control stream is directed against the side of the power stream and deflects the power stream away from the control stream. The power stream flows at an angle with respect to its original direction, the tangent of this angle being a function of the momentum of the control stream and the original momentum of the power stream. Thus it is possible to selectively deflect the power stream to one or more target areas or outlet channels where it may perform a work function.

In boundary layer control amplifiers the power stream is directed to a target area or outlet channel by the pressure distribution in the boundary layer region of the power stream. This pressure distribution is controlled by the wall configuration of the interaction chamber, the energy level of the power stream, the fluid transport characteristics, the back loading of the output channels and the flow of control fluid into the boundary layer region. The selective deflection of the power stream into one outlet channel or the other is controlled by introducing control fluid into the boundary layer of the power stream. As a result of the change in pressure distribution in the power stream and its boundary layer the power stream is caused to switch to the other outlet channel. The configuration of the interaction chamber may be designed such that the power stream becomes locked to a side wall and remains locked thereto, even though the flow of control fluid has been terminated.

Broadly it is an object of the invention to provide novel types of pure fluid amplifiers.

It is a further object of the invention to provide a pure fluid amplifier in which the power stream is controlled by a control fluid stream which acts traverse the power stream.

It is a still further object of the invention to provide a pure fluid amplifier in which the power stream is controlled by a control fluid stream which acts traverse the power stream, which may be used as an oscillator.

It is a still further object of the invention to provide a pure fluid amplifier in which the power stream is controlled by a control fluid stream which acts traverse the power stream, which has memory properties.

It is a still further object of the invention to provide a pure fluid amplifier in which the power stream is controlled by a control fluid stream which acts traverse the power stream, which may be used as a pulse counter.

It is a still further object of the invention to provide a pure fluid amplifier in which the power stream is controlled by a control fluid stream which acts traverse the power stream, which may be used as pulse counter having a high speed of counting.

According to the invention in a fluid amplifier of the boundary layer control type, the power stream is controlled by means of a control stream which enters the interaction chamber of the device substantially in a direction reverse to the direction of flow of the power stream, and which controls the power stream by piercing and traversing it and influencing the boundary layer lock-on region by influencing the pressure therein.

Figure 1A:
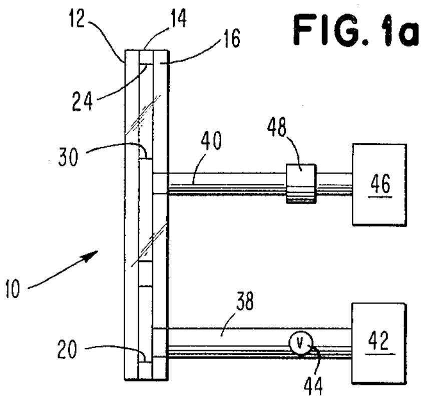
Figure 2:
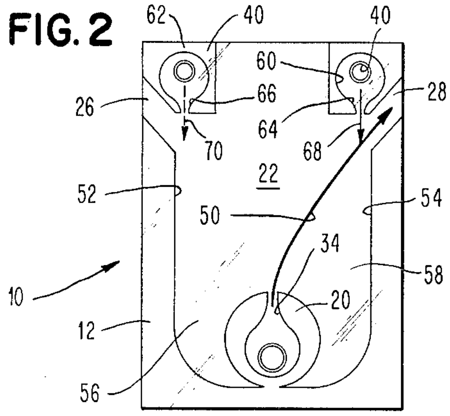
Figure 2A:
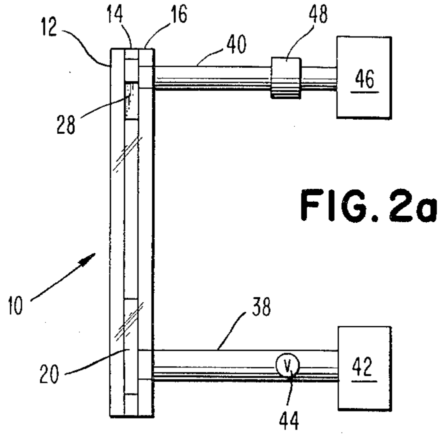
Figure 3:
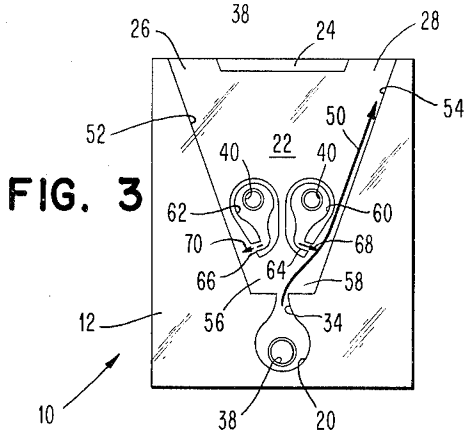
Figure 3A:
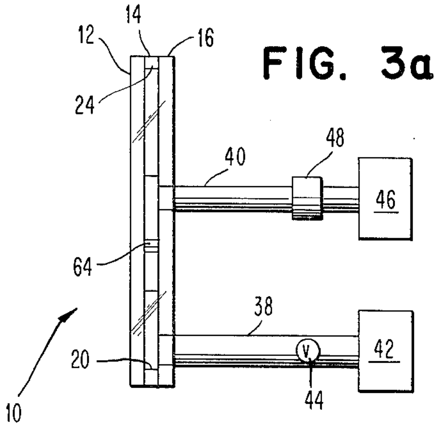

The above and still further objects, features and advantages of the present invention will become apparent from the following description and the accompanying drawings in which:

FIG. 1 illustrates a plan view of the device according to the invention,

FIG. 1*a* illustrates a side view of the device of FIG. 1 showing the means for applying fluid to the device, FIG. 2 illustrates a plan view of a modification of the device of FIG. 1, FIG. 2*a* illustrates a side view of the device of FIG. 2 showing the means for applying fluid to the device, FIG. 3 illustrates a plane view of a further modification of the device of FIG. 1, and FIG. 3*a* illustrates a side view of the device of FIG. 3 showing the means for applying fluid to the device.

Referring more particularly to FIGURES 1 and 1*a*, one embodiment of a fluid amplifier according to this invention is indicated by reference numeral 10. The device 10 is formed by three laminae 12, 14 and 16. Lamina 14 is positioned between laminae 12 and 16 and is tightly sealed between them by suitable means such as screws or cement. The laminae 12, 14 and 16 may be of any metallic, plastic or other suitable material. For the purpose of illustration, laminae 12, 14 and 16 are shown as being of a clear plastic material.

The lamina 14 has a cut-out section which may be provided by means of a cutting or stamping operation. The entire cut-out section is designated as a configuration 18. The configuration 18 includes a fluid supply inlet 20 and a chamber 22.

A dam 24 extending between laminae 12 and 16 may define two power stream outlets 26 and 28 of chamber 22. A dam 30 extending between laminae 12 and 16 defines a control stream inlet 32 within chamber 22.

The inlets 20 and 32 form a constricted supply and control orifice 34 and 36 respectively, both opening into chamber 22. The term orifice as used herein includes orifices having parallel, converging or diverging walls of any conventional shape. The orifices 34 and 36 are substantially in alignment with each other and directed oppositely. The supply inlet 20 and the control inlet 32 communicate with tubes 38 and 40 respectively, which are connected to lamina 16.

The power stream outlets 26 and 28 may communicate with the surrounding atmosphere or may communicate with various other control or utilization devices (not shown).

The end of tube 38, extending from lamina 16, is connected to a source 42 of fluid under pressure. The fluid under pressure may be air or a gas, or water or other liquid. The above applies equally to the nature and properties of the fluid used as control fluid. Fluid regulating devices, such as a valve 44, may be used in conjunction with the fluid source 42 so as to insure a constant flow of fluid at a desired pressure. Such fluid regulating devices are of conventional construction.

A source 46 of fluid under pressure provides the control stream at the inlet 32 via tube 40. Numeral 48 indicates any means, such as a pressure transducer, which may cause a variation in pressure in the control fluid carried in tube 40.

Fluid flowing from source 42, entering the device 10 through inlet 20 is assumed to be at a certain pressure above atmospheric pressure. As the stream of fluid is reduced in cross-sectional area by the inlet orifice 34 its velocity increases. The stream of reduced cross-sectional area 50 leaving orifice 34 and entering chamber 22, is called the power stream of the device. Walls 52 and 54 of chamber 22 are set back from orifice 34, so as to create off-set regions 56 and 58. Due to these off-set regions, power stream 50 will be enhanced to lock onto either of the walls in accordance with the boundary layer control principle discussed above.

Assume for the purpose of explanation that the power stream 50 is locked onto wall 54 of chamber 22. The power stream leaves the device through outlet 28 of the chamber.

If now a control stream 60 issues from orifice 36, this control stream will pierce the power stream 50 and the fluid contained in the control stream will, at least partially, enter the low pressure region 58 between the power stream 50 and wall 54. As a result, the pressure in this region will rise and the stability of the power stream will be affected. If the pressure in region 58 has reached a sufficient level, the power stream 50 will switch over to and lock onto wall 52. If the control stream has terminated in the meantime, the power stream will stay locked in this new position.

If the control stream 60 does not terminate but issues continuously from orifice 36, the power stream will switch back immediately to wall 54 and from there, back to wall 52 and so on. Thus it is seen that the device as described may operate as an oscillator under the influence of a constant control stream input. The frequency of the oscillation, of course, is dependent on several factors such as the pressure of the control fluid, the volume of the off-set regions, the energy contained in the power stream.

The device as described may further be used as a counter, counting the pulses as represented by control stream pulses issuing from orifice 36. For each control, pulse the power stream switches from one state to the other, its output appearing at either outlet 26 or 28 and representing a count. From the operation of the device it will be clear that it is capable of rapid counting, since the counter need not be reset before being able to receive a subsequent count pulse.

From the above it will be seen that the power stream will remain deviated or switched towards either outlet into which it was last directed by the control stream, even after the control pulse has ended. Since, accordingly, information may be introduced into the device at a certain moment and be extracted at a later moment, the device has memory properties and may be used, for example, as a memory unit in fluid data processors.

Further, since the energy contained in the control stream may be of a lower level than that of the power stream, the device has amplification properties and may therefore be called a fluid amplifier. Since the device has no moving parts except the operating fluid, it may be called a pure fluid amplifier.

Referring now particularly to FIGS. 2 and 2*a* there is illustrated another embodiment using the fundamental principle of the invention, i.e. the control of a power stream by a fluid stream acting traverse the power stream. Like parts are indicated by the same numerals as in FIGS. 1 and 1*a*. It will be noted that, as compared with FIGS. 1 and 1*a*, in FIGS. 2 and 2*a* two control stream orifices have been provided and that these orifices are directed at an angle to the power stream. Specifically, the control stream inlets 60 and 62 form constricted control stream orifices 64 and 66 respectively, both opening into chamber 22. Control stream inlet 60 communicates with tube 40, connecting it with control fluid source 46, via transducer 48. Control stream inlet 62 is similarly connected with a source of control fluid which is not visible in the side view on the drawing (FIG. 2*a*) since it is obscured by the arrangement of the control stream supply described for control stream inlet 60.

Assume for the purpose of explanation that the power stream 50 is locked onto wall 54 of chamber 22. The power stream then leaves the device through outlet 28. If now a control stream 68 issues from orifice 64, this control stream will pierce and traverse the power stream 50 and the fluid contained in the control stream will, at least partially, enter the low pressure region 58 between the power stream 50 and the wall 54. As a result, the stability of the power stream will be affected and, as explained hereinabove, for the device of FIG. 1, the power stream will switch over to, and lock onto wall 52. If a control stream issues from orifice 66 while the power stream is locked onto wall 52, the power stream will be switched back to wall 54 in the same manner as explained for the previous switching action.

If the control streams do not issue as pulses from the orifices 64 and 66 but as continuous streams, the power stream will be caused to oscillate between the walls 54 and 52. The frequency of the oscillation is determined by several factors such as the pressure of the control fluids, the volume of the chamber and the energy contained in the power stream.

The device may also be used as a counter, counting the pulses as represented by control stream pulses issuing from the control orifices.

Since, as explained, the power stream will remain deviated or switched towards either outlet into which it was last deflected by a control stream, even after termination of that control stream, the device has memory properties.

Further, since the energy contained in the control streams may be of a lower level than that of the power stream, the device has amplification properties.

Referring now particularly to FIGS. 3 and 3*a* there is illustrated another embodiment using the fundamental principle of the invention, i.e. the control of a power stream by a fluid stream acting traverse the power stream. Like parts are indicated by the same numerals as in FIGS. 1, 1*a*, 2 and 2*a*. It will be noted that as compared with FIG. 1, in FIGS. 3 and 3*a* two control stream orifices have been provided and that these orifices are directed perpendicularly to the power stream. Specifically, the control stream inlets 60 and 62 form constricted control stream orifices 64 and 66 respectively, both opening into chamber 22. Control stream inlet 60 communicates with tube 40, connecting it with control fluid source 46, via transducer 48. Control stream inlet 62 is similarly connected with a source of control fluid which is not visible in the side view of the drawing (FIG. 3*a*), since it falls behind the arrangement of the tubes 40, transducer 48 and source 46 for control stream inlet 60.

Assume for the purpose of explanation that the power stream 50 is locked onto wall 54 of chamber 22. The power stream leaves the device through outlet 28. If now a control stream 68 issues from orifice 64, this control stream will pierce the power stream 50 and the fluid contained in the control stream will, at least partially, enter the low pressure region 58 between the power stream 50 and the wall 54. As a result the stability of the power stream is affected and, as explained hereinabove for the device of FIG. 1, will switch over to and lock onto wall 52. The power stream will stay locked in this new position until the issuance of a control stream 70 from control orifice 66, which will cause the power stream to switch back and lock onto wall 54.

It will be understood that the device as described may operate as an oscillator under the influence of two constant control stream inputs issuing from orifices 64 and 66. The frequency of the oscillation is dependent on several factors such as the pressure of the control fluids, the volume of the off-set regions, the energy contained in the power stream.

The device as described may also be used as a counter, counting the pulses as represented by control stream pulses issuing from the control orifices.

Since, as explained for FIGS. 1 and 2, the power stream will remain deviated or switched towards either outlet into which it was last directed by the control stream, even after termination of the control streams, the device has memory properties.

Further, since as explained for FIGS. 1 and 2 the energy contained in the control streams may be of a lower level than that of the power stream, the device has amplification properties.

It will be understood that modifications and variations may be effected without departing from the scope of the invention. For example, it will be understood that, although the devices illustrated and described are basically of planar construction, a device according to the invention may have a third dimension of substantial magnitude. Further, the number of power stream inlets, interaction chambers, control stream inlets and power stream outlets may be varied as a specific application of the device may require.

The embodiments of the invention in which an exclusive property or privilege is claimed are defined as follows:

1. A fluid multi-stable device comprising a first, a second and a third lamina, said second lamina being fluid-tightly sealed between said first and third lamina, said second lamina having a cut-out configuration having a longitudinal axis, said cut-out configuration comprising a power stream inlet chamber and a main chamber, said power stream inlet chamber communicating with said main chamber through a first constricted passage, a source of fluid under regulated pressure connected to said power stream inlet chamber, a control stream inlet chamber located within said main chamber and spaced from the walls of said main chamber to permit fluid flow all around said control stream inlet, said control stream inlet chamber communicating with said main chamber through a second constricted passage, said first and second constricted passages being disposed directly opposite and substantially colinearly directed toward each other, and a source of control fluid under pressure connected to said control stream inlet chamber.

2. A fluid multi-stable device comprising a power stream inlet, a chamber, said chamber having a first and a second wall, said chamber communicating with said power stream inlet through a first constricted passage, a first and a second control stream inlet located within said chamber and forming with said first and second walls, respectively, a first and second flow path, said first control stream inlet terminating in a second constricted passage directed substantially perpendicular to said first wall for providing a control stream from within said first control stream inlet outwardly toward said first wall, said second control stream inlet terminating in a third constricted passage directed substantially perpendicular to said second wall for providing a control stream from within said second control stream inlet outwardly toward said second wall.

3. A fluid multi-stable device comprising a first, a second and a third lamina, said second lamina being fluid-tightly sealed between said first and third lamina, said second lamina having a cut-out configuration, said cut-out configuration comprising a power stream inlet chamber and a main chamber, said main chamber having a first and a second wall, said power stream inlet chamber communicating with said main chamber through a first constricted passage, a source of fluid under regulated pressure connected to said power stream inlet chamber, a first control stream inlet chamber located within said main chamber and communicating with said main chamber through a second constricted passage, a second control stream inlet chamber located within said main chamber and communicating with said main chamber through a third constricted passage, said second constricted passage being directed substantially perpendicular to said first wall, said third constricted passage being directed substantially perpendicular to said second wall, and a second and a third source of fluid under pressure connected to said first and second control stream inlet respectively.

References Cited by the Examiner

UNITED STATES PATENTS

| | | | |
|---|---|---|---|
| 3,098,504 | 7/1963 | Joesting | 137—624.14 |
| 3,158,166 | 11/1964 | Warren | 137—81.5 |
| 3,170,476 | 2/1965 | Reilly | 137—81.5 |

OTHER REFERENCES

Scientific American, volume 207, No. 2, August 1962, "Amateur Scientist," p. 129, figure labeled symmetrical flip-flop.

MARTIN P. SCHWADRON, *Acting Primary Examiner.*

LAVERNE D. GEIGER, M. CARY NELSON, *Examiners.*

S. SCOTT, *Assistant Examiner.*